United States Patent

Peterson

[15] 3,641,850
[45] Feb. 15, 1972

[54] ADJUSTMENT FOR TOOL HOLDERS
[72] Inventor: Anders A. Peterson, Elmira, N.Y.
[73] Assignee: Hardinge Brothers, Inc., Elmira, N.Y.
[22] Filed: Dec. 15, 1969
[21] Appl. No.: 884,784

Related U.S. Application Data

[63] Continuation-in-part of Ser. No. 713,057, Mar. 14, 1968, abandoned.

[52] U.S. Cl. .................................................. 82/36
[51] Int. Cl. ............................................. B23b 29/10
[58] Field of Search ...................... 82/36, 37, 24; 77/58 J

[56] References Cited

UNITED STATES PATENTS

| | | | |
|---|---|---|---|
| 2,540,289 | 2/1951 | Randall | 82/36 |
| 2,391,878 | 1/1946 | Cassia | 82/36 |
| 1,502,712 | 6/1924 | Chard | 82/36 X |
| 3,069,932 | 12/1962 | Sweeny et al. | 77/58 J |
| 2,874,597 | 2/1959 | Bach | 77/58 J |
| 3,377,685 | 4/1968 | Carlstedt | 82/37 X |

Primary Examiner—Leonidas Vlachos
Attorney—Shlesinger, Arkwright & Garvey

[57] ABSTRACT

This invention relates to a device for adjusting a machine tool through extremely small increments of movement by means of a micrometer dial attached to an adjusting screw. Rigidity of the tool is maintained, after adjustment, by a lock bolt which prevents movement of the tool-holding part relative to its base. The lock bolt includes an adjustment means attachable to the lock bolt for regulating locking pressure. Between the lock bolt and the tool-holding part is positioned a spring for maintaining a constant minimum pressure along the axis of movement of the tool-holding part for eliminating backlash in component parts of the tool-holding part when direction of the cutting tool movement is reversed.

11 Claims, 11 Drawing Figures

3,641,850

INVENTOR.
Anders Adolf Peterson

BY
Schlesinger, Arkwright & Garvey
ATTORNEYS

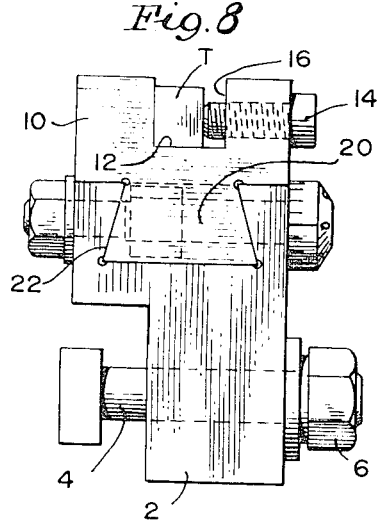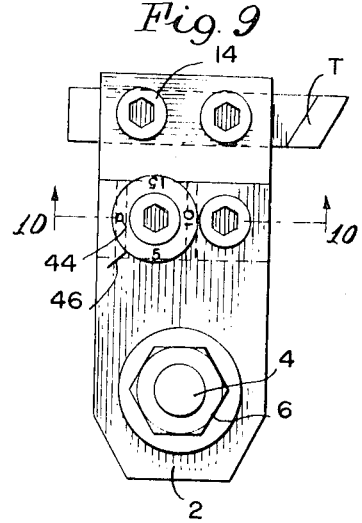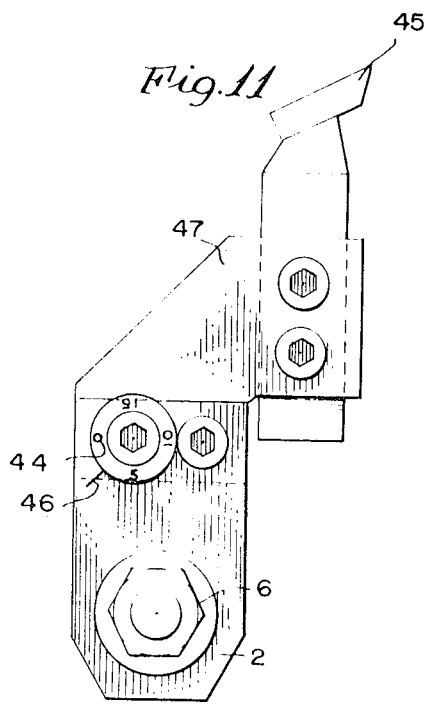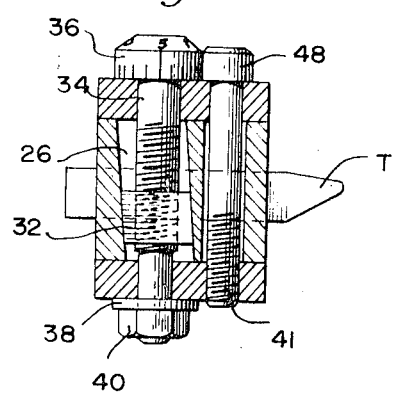

ADJUSTMENT FOR TOOL HOLDERS

This application relates to an adjustment for tool holders as disclosed in application Ser. No. 713,057, and is a continuation-in-part of that application which was filed Mar. 14, 1968, and now abandoned.

PRIOR ART DEVELOPMENTS

Devices for precision adjustment of cutting tools which utilize dovetail-shaped slides that fit in similarly shaped slots and key blocks laterally slidable in a channel and including an annularly disposed key which fits into a groove on the dovetail part for moving that part are old in the art.

However, prior art devices do not include means separate from the adjusting means for locking the tool firmly in position relative to the base on which the tool-holding part is slidable. Such a separate locking means is desirable for maintaining the tool firmly in place in its finally adjusted position.

In addition, when the direction of cutting tool travel is reversed a backlash occurs in these adjustment devices between integral parts of the tool holding part.

OBJECTS AND SUMMARY

It is therefore, an object of this invention to provide an adjustment for tool holders which allows for fine increment adjustment of cutting tools.

Another object of this invention is to provide an adjustment for tool holders which includes a lock for firmly holding the cutting tool in working position.

A further object of this invention is to provide an adjustment for tool holders which includes a lock that applies a uniform clamping pressure after each different adjustment in tool position.

Still further object of this invention is to provide an adjustment for tool holders which includes means for preventing backlash among components of the tool holding part when tool direction is reversed.

Still another object of this invention is to provide a compact sturdy tool holder which is easily machined and inexpensive to manufacture.

Yet another object of this invention is to provide an adjustment for tool holders in which repeat settings of tool position can be easily obtained.

To summarize, it is therefore an object of this invention to provide an adjustment for tool holders which allows for fine incremental adjustment of machine tools and includes a lock separate from the adjustment means for firmly holding a machine tool in final adjusted position and a spring means for eliminating backlash among integral components of the tool holding part.

These and other objects of this invention and advantages and capabilities will be apparent from the following description and appended claims and accompanying drawings in which:

FIG. 8 is a back side elevational view of the adjustment for tool holders illustrated in FIG. 1 and excluding the modifications to the lock bolt which provide uniform clamping pressure.

FIG. 9 is a right side elevational view of the adjustment for tool holders as illustrated in FIG. 8.

FIG. 10 is a cross-sectional view taken along lines 10—10 of FIG. 9 and viewed in the direction of the arrows showing the operation of the adjustment means and its threadedly engaged key block and the clamping bolt which locks the tool-holding part with respect to the base.

FIG. 11 is a right side elevational view of an adjustment for tool holders similar to the one illustrated in FIG. 8, but with modifications for mounting of a different type of tool.

FIGS. 1 THROUGH 7

Figure 1:
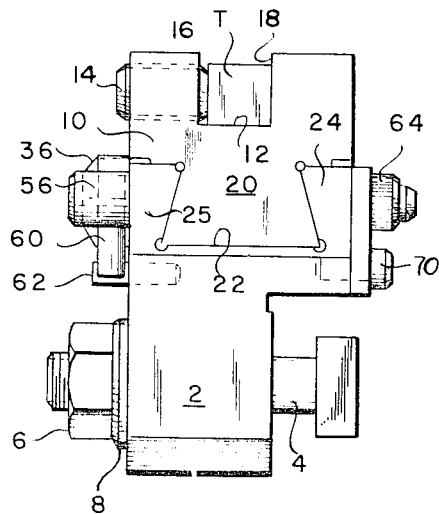
FIG. 1 is a front elevational view of the adjustment for tool holders having a tool-holding part interconnected with a base as taught by this invention.

In the tool holder shown in the appended drawings, 2 represents the body part, support, or base of the tool holder which is designed and formed to be secured either to a turret, tool slide, or other part of a lathe-type machine (not shown). The base 2 can be attached to such a machine, for example, by means of a T-bolt 4 of the usual type, including a nut 6 and washer 8 which is interposed between nut 6 and base 2.

The adjustable part 10 holds the cutting tool T in recess 12 in part 10. The cutting tool T is held therein by means of clamp screws 14 which are threadedly engaged with wall 16 of recess 12. The heads of screws 14 include hexagonal adjusting holes 15 for receiving an Allen wrench. The screws 14 when in clamping position clamp the tool T against wall 18 of recess 12. This tool-holding part 10 includes a male dovetail connector 20 which slidably fits into dovetail-shaped female slot 22 formed by walls 24 and 26 of base 2.

Tool-holding part 10 moves slidably relative to base 2 in order to move the attached cutting tool T relative to a workpiece (not shown). Various methods can be employed to accomplish this movement. A slide or passage 26 extends crosswise or transversely across male part 20. For the purposes of this description male part 20 is dovetailed in shape and fits into correspondingly shaped female part 22. Transverse slot 26 includes parallel sides 28 and 30 which are angularly disposed to the direction of tool movement. In transverse slot 26 is positioned key block 32 arranged to move transversely relative to tool-holding part 10. The movement of key block 32 is affected by means of an adjusting screw 34 which has a threaded engagement with key block 32 and which extends transversely across dovetailed-shaped male connector 20. Adjusting screw 34 extends through walls 24 and 25 which form dovetailed-shaped female slot 22. On the outer ends of adjusting screw 34 is a micrometer dial 36 at one end and washer 38 and nut 40 at the other end. Adjusting screw 34 is threaded on its portion that extends through dovetailed-shaped slot 20, that portion movably engaging key block 32. Adjusting screw 34 is also threaded on the end opposite micrometer dial 36 for receiving nut 40. Micrometer dial 36 includes a hexagonal adjusting hole 42 for receiving an Allen wrench for accomplishing fine adjustment of the cutting tool T. It will thus be seen that any rotational adjustment of screw 34 acts to move key block 32 transversely relative to tool-holding part 10. Such transverse movement in either direction imparts a force on one of the angularly disposed walls 28 or 30 which causes a small longitudinal movement of tool-holding part 10 with respect to base 2.

For example, one possible variation of this invention was found upon arranging walls 28 and 30 of slot 26 at an angle of 4° from the axis of adjusting screw 34. By providing adjusting screw with a 32 pitch thread, a one-twentieth turn of adjusting screw 34 acts to move cutting tool T approximately one tenthousandth of an inch.

Adjusting screw 34 which is fixed but rotatable with respect to walls 24 and 25, which form dovetailed-shaped female slot 22, includes micrometer head 36 which has provided thereon graduations 44 which have been calibrated to reflect relative movement which has been imparted by adjusting screw 34 onto the cutting tool. Graduations 44 are moveable relative to a fixed point or zero line 46 located on the outer edge of wall 25. Zero line 46 indicates, when read with respect to graduations 44, the extend to which adjustment screw 34 has been turned. From such a reading the distance that a cutting tool T mounted on tool-holding part 10 has moved can be determined. Nut 40 is a locking-type nut and is closely fitted onto the end of adjusting screw 34 opposite from micrometer dial 36. By using such a locking-type nut 40, all the end play may be removed from adjusting screw 34 and the looseness between male dovetail portion 20 and female part 22 can be kept at a minimum. This tight fit is advantageous when adjusting in very small increments. From the foregoing it is obvious that when adjusting screw 34 is rotated key block 32 moves transversely relative to tool-holding part 10 and angularly disposed passage 26, thereby transmitting motion to tool-holding part 10 longitudinally relative to base 2.

Figure 4:
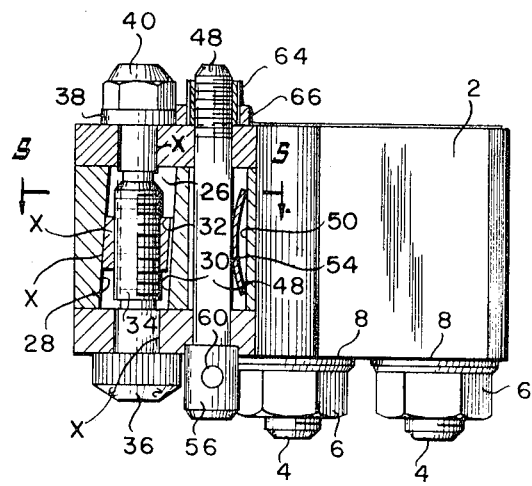
FIG. 4 is a cross-sectional view taken along lines 4—4 of FIG. 2 and viewed in the direction of the arrows showing the operation of the adjustment means and its threadedly engaged key block and the clamping bolt which locks the tool-holding part with respect to the base.
Figures 6, 7:
FIG. 6 is a front elevational view of a spring used in FIG. 5.
FIG. 7 is a right side elevational view of the spring illustrated in FIG. 6.
Figure 5:
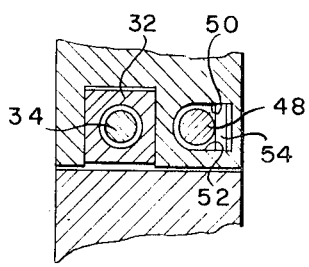
FIG. 5 is a fragmentary cross-sectional view taken along the lines 5—5 of FIG. 4 and viewed in the direction of the arrows showing the cross-sectional arrangement of the key block and the spring which is located between the clamping bolt and the tool-holding part.

After the cutting tool T has been adjusted to the extent desired it is preferably locked in its new position. One method of locking is by means of a lock screw 48 which extends through walls 24 and 25 forming female slot 22 and through channel 50 in dovetail-shaped male connector 20. Channel 50 is wide enough to permit the full range of movement desired for the cutting tool T. In channel 50 between one of its walls 52 and the side of lock screw 48 facing away from adjusting screw 34 is located a spring 54. Spring 54 is preferably a semicircular steel spring, but a spring constructed of rubber or other resilient materials can also be used. Spring 54 in its position shown in FIG. 4 imparts a pressure to the right against tool-holding part 10. This constant pressure urges tool-holding part 10 to the right in FIG. 4 at all times thereby maintaining a constant minimum pressure at points X shown in FIG. 4. One decided advantage of using spring 54 to impart the hereinbefore described constant minimum pressure is that when tool-feeding screw 34 is reversed a backlash effect at points X is prevented. The relatively small movement of travel of tool-holding part 10 in relation to base 2 allows spring 54 to impart its constant minimum pressure by not requiring a relatively large longitudinal movement for compression and expansion of spring 54.

At one end of lock screw 48 is head 56 in which is located hexagonal hole 58 which is adapted for use with an Allen wrench. Extending outwardly from head 56 and perpendicular to the axis of lock screw 48 is pin 60. Acting in relation to pin 60 is post 62 which extends outwardly from base 2 into the annular path of movement of pin 60. Post 62 acting in relation to pin 60 is a stop for preventing complete 360° rotation of lock screw 48.

At the end of lock screw 48 opposite head 56 is locknut 64 which is threadedly engaged with that end of lock screw 48. The outer edge of locknut 64 includes involute serrations. Strip nut 66 which includes a serrated hole 68 for mating with locknut 64 is anchored at one end to base 2 by means of screw 70. Screw 70 includes a hexagonal hole 72 so that screw 70 can be locked in place by means of an Allen wrench. Lock bolt 48, with its annular movement limited as herein described and acting in conjunction with locknut 64 and strip nut 66, compells the machine operator to maintain the same clamping pressure on dovetail-shaped male connector 20 after each adjustment of the setting of the cutting tool. In this manner repeat settings of tool position can be obtained easily.

In FIGS. 1 through 5 my improved adjustable tool holder is illustrated as applied to a square shank tool bit. It is obvious that with small adjustments in the design of tool-holding part 10 this invention may be applied to other cutting tools such as a boring tool. FIGS. 8 THROUGH 11

In the tool holder shown by way of example in FIGS. 8 through 11, 2 represents the body part or support of the tool holder which is formed to be secured to a turret, tool slide or other part of a machine, for example, by means of a T-bolt 4 of the usual type, including a nut 6. The adjustable part 10 of the device which holds the tool, for example, a square shank tool bit T, is shown in FIGS. 8–10 which is secured in a recess 12 in the part 10 and held therein by means of screws 14 which clamp the tool against one side of the recess 12. This tool-carrying part 10 of the holder in the construction illustrated by way of example, is provided with a male dovetail portion 20 which fits into a female part 22 formed in the support 2. In prior constructions the male part slid relatively to the female part to move the tool T relatively to the work, this being done by means of a screw acting directly on the male part. However, the adjustments which can be made in this manner are not suitable for moving the tool through extremely small increments and still maintain rigidity after the adjustment is made. Modern machines which work to very close tolerances require frequent adjustments to compensate for wear of the tool and these adjustments are often only a tenth of a thousandth of an inch.

In order to overcome this difficulty an adjustment is provided herein by means of which very small increments can be affected in the position of the tool. For example, by having the adjusting screw operate on a block slidable in the male part of the dovetailed joint at an angle to the direction of movement of the male part, a very small increment of movement may be affected by relatively large movement of the adjusting screw. In the construction shown for this purpose, I have provided a slot or passage 26 which extends crosswise of the male part of the dovetailed connection at an angle to the direction in which the tool is to be moved. In this passage a block 32 is arranged for sliding lengthwise of the slot, and the movement of the block is affected through the medium of an adjusting screw 34 which has a threaded engagement with the block 32 and which extends across the dovetailed joint being mounted to rotate in the female part of the joint. It will thus be seen that any adjustment of the screw 34 moves the block 32 in the angularly arranged passage 26 and thus imparts a very small motion to the tool-holding part 10. For example, it has been found that by arranging the passage 26 at an angle of 4° from the axis of the adjusting screw, and by providing the adjusting screw with a 32 pitch thread, then a one-twentieth turn of the adjusting screw produces approximately one ten-thousandths of an inch movement of the tool. The angle and pitch may of course be varied to get any increment desired.

The adjusting screw, which is rotatable upon the female part of the joint, has a head 36 provided thereon with graduations 44 movable relatively to a fixed point or zero line 46 on the female part of the joint, to indicate the extent to which the screw has been turned. The opposite end of the adjusting screw is shouldered across the outside of the shank portion with a washer 38 and a locking-type nut 40 and is closely fitted into bores contained therein. By using a locking-type nut, all the end play may be removed from the screw 34 and the looseness between the male dovetail portion 20 and the female part 22 can be kept at a minimum. This is advantageous when adjusting in very small increments. It will now be obvious that if the adjusting screw is rotated the angle block 32 moves up and down the slot or passage 26, thus transferring motion to the tool-holding part 10 relatively to the support part 2.

When the tool has been adjusted to the extent desired, it is preferably locked in such position, for example, by means of a lock screw 48 extending across the two sides of the female dovetailed part 22. This lock screw passes freely through one of the sides of the female dovetail part and has a threaded engagement with the other side thereof, as shown at 41, so that when the lock screw is tightened it tends to draw the two sides of the female joint towards the male part thereof, thus locking the same.

In FIGS. 8–10 I have shown my improved adjustable tool holder as applied to a square shank tool bit. In the boring tool type of holder shown in FIG. 11, it will be obvious that the small adjustment described may be applied to a boring tool 45 which can be mounted on a bracket 47, also having a male dovetail portion 20 which fits the female part 22 in the support.

OPERATION

Figure 2:
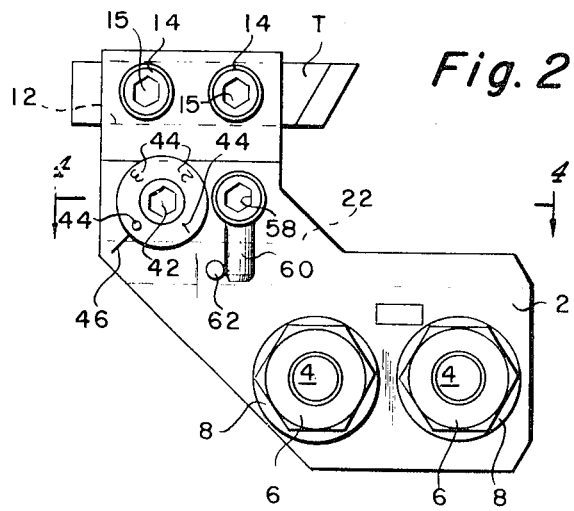
FIG. 2 is a left side elevational view of the adjustment for tool holders illustrated in FIG. 1.
Figure 3:
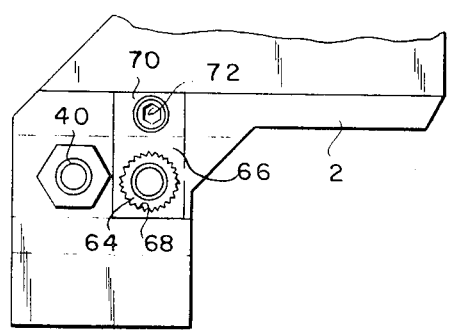
FIG. 3 is a right side elevational view of the adjustment for tool holders illustrated in FIG. 1.

From the foregoing, it is obvious that when micrometer dial 36 is turned by an Allen wrench fitting in hexagonal hole 42, screw 34 will be turned. Key block 32, threadedly engaged upon screw 34 is thereby moved along the axis of adjusting screw 34. As key block 32 moves it imparts pressure upon either one of angularly disposed channel walls 28 or 30 causing tool-holding part 10 to move small respective distances along its longitudinal axis. After the desired movement is completed, tool-holding part 10 is locked by means of lock screw 48 clamping walls 24 and 25 which form dovetail-shaped female slot 22, together. By the position of post 62 with respect to hole 60, and locknut 64 and strip nut 66, the same locking or clamping pressure can be obtained upon each adjustment. With strip nut 66 being anchored to base 2, locknut 64 is maintained in a stationary position. Ideal clamping pressure can be determined beforehand thereby finding the proper stationary position in which to place locknut 64. The position of lock screw 48 as shown in FIG. 2 is that of its clamping position. For clamping pressure to be released lock screw 48 would be turned in a counterclockwise direction. After the adjustment to desired cutting tool position is completed lock screw 48 would be returned to the position shown in FIG. 2 thereby imparting the same clamping pressure as was imparted before the adjustment was made.

While the invention has been described in connection with the preferred embodiment, it will be understood that it is capable of further modification. This application is intended to cover any variations, uses, or adaptions of the invention following, as well as the principles of the invention in general including such departures from the present disclosure as come within known or customary practice in the art to which the invention pertains and further including such departures as may be applied to the essential features hereinbefore set forth and fall within the scope of the invention or the limits of the appended claims.

Having thus described my invention, what I claim is:

1. An adjustable tool holder comprising:
   a. a base,
   b. a tool-holding part adjustably mounted on said base,
   c. means for moving said tool-holding part relative to said base,
   d. lock means for preventing movement of said tool-holding part relative to said base,
   e. said base including a pair of walls extending outwardly therefrom and forming a female slot,
   f. said tool-holding part including a male connector slidably fitting in said female slot,
   g. said lock means including bolt means passing through said walls and said male connector for releasably locking said tool-holding part, and
   h. stop means for preventing complete rotation of said bolt means.

2. An adjustable tool holder as in claim 17 and wherein:
   a. said lock means further includes nut means in threaded engagement with said bolt means.

3. An adjustment for tool holders as described in claim 1 and wherein:
   a. said walls forming said female slot are angularly disposed on their inside edges relative to said base for forming a dovetail-shaped slot; and
   b. the outside edges of said male connector are angularly disposed relative to the transverse axis of said male connector for forming a dovetailed-shape connector for slidably fitting in said female slot.

4. An adjustable tool holder as described in claim 1 and wherein:
   a. said stop means includes a pin means connected to the head of said bolt means and extending perpendicular to the axis of said bolt means, a post means connected to and extending outwardly from said base into the path of annular movement of said post means connected to the head of said bolt means, and an adjustment means attachable to said bolt means for regulating locking pressure.

5. An adjustable tool holder as described in claim 4 and wherein:
   a. said adjustment means includes a locknut member threadedly engaging said lock bolt means and including an involute serrated outer edge, and a strip nut means anchored to said base including a serrated hole for mating with said serrated outer edge of said locknut member.

6. An adjustable tool holder as described in claim 1 and wherein:
   a. said moving means includes a channel in said tool-holding part angularly disposed to the axes of said part, a key block totally slidably fitting in said channel and trapezoidal in longitudinal cross section and including a threaded bore and adjusting screw means transversely passing through said walls forming said female slot and in said channel in said tool-holding part threadedly engaging said key block; and
   b. whereby said screw means is turned said key block means moves transversely relative to said tool-holding part and said base in said angularly disposed channel causing said tool-holding part to move longitudinally relative to said base.

7. An adjustable tool holder as described in claim 6 and including:
   a. pressure means for maintaining a constant minimum pressure along the axis of movement of said tool-holding part, for maintaining said pressure between said key block and one wall of said channel and between said walls that form said female slot and a portion of said adjusting screw means that passes through said walls.

8. An adjustable tool holder as described in claim 7 and wherein:
   a. said pressure means includes a spring means positioned along the axis of said bolt means on the side away from said moving means between said bolt means and said tool-holding part.

9. An adjustable tool holder as described in claim 8 and wherein:
   a. said spring includes a rubber spring means.

10. An adjustable tool holder as described in claim 8 and wherein:
    a. said spring means includes a metal spring means.

11. An adjustable tool holder as described in claim 8 and wherein:
    a. said cutting tool is held in a cutting position transversely relative to the vertical axis of said tool-holding part.

* * * * *